Feb. 16, 1926.

C. H. DESAUTELS 1,573,305

HEATER CONNECTION

Filed Oct. 17, 1922          2 Sheets-Sheet 1

INVENTOR

Charles H. Desautels

BY

ATTORNEY

Feb. 16, 1926.  
C. H. DESAUTELS  
HEATER CONNECTION  
Filed Oct. 17, 1922  
1,573,305  
2 Sheets-Sheet 2
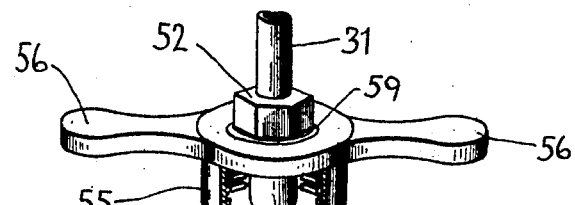
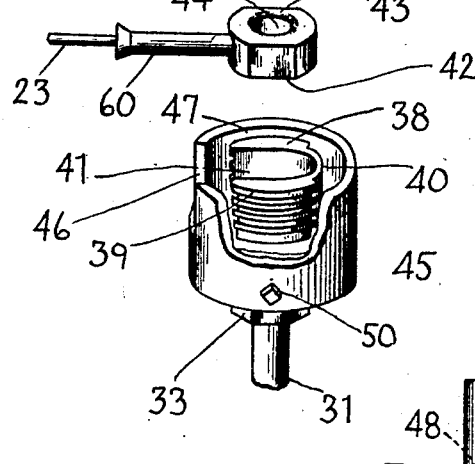
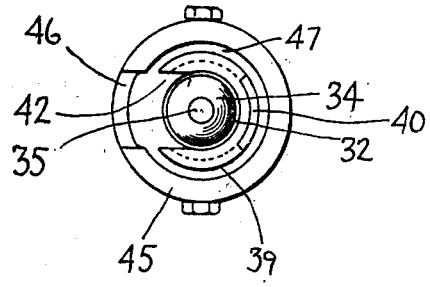
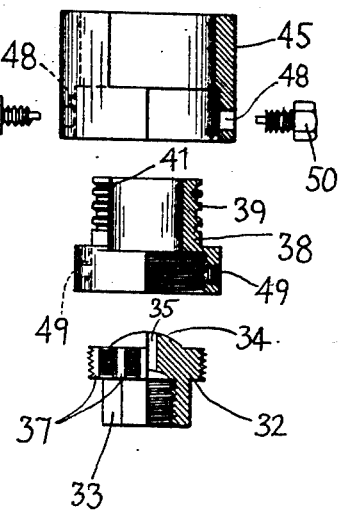
INVENTOR  
Charles H. Desautels  
BY  
ATTORNEY Patented Feb. 16, 1926.

1,573,305

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

HEATER CONNECTION.

Application filed October 17, 1922. Serial No. 595,208.

*To all whom it may concern:*

Be it known that I, CHARLES H. DESAUTELS, a citizen of the United States of America, residing at Springfield, in the county of Hampden and State of Massachusetts, have invented certain new and useful Improvements in Heater Connections, of which the following is a specification.

My invention relates to connections especially designed for supplying fluid under pressure to the interior of tire casings during vulcanization in a heater, and has for its object the improvement of connections for this purpose in the features of rapidity of assembly and disassembly, protection of vulnerable parts against injury, accuracy of registry of the several parts, and in various other particulars which will appear from the following description and claims. It has for a particular object the provision of a device of this description which will present the minimum of operations during the period of stacking the tire molds in the heater, and will permit certain of the connections to be made when the tires are assembled with their internal pressure bags and before they are placed in the heater.

The invention will now be described in connection with the accompanying drawings, in which—

Fig. 5 is a perspective view, partly broken away, showing the various elements of one coupling disassembled but in registration;
Fig. 6 is a plan view of the lower member of one of the couplings; and Fig. 7 is a separated assembly of the various elements going to make up the lower part of the coupling.

Figure 1:
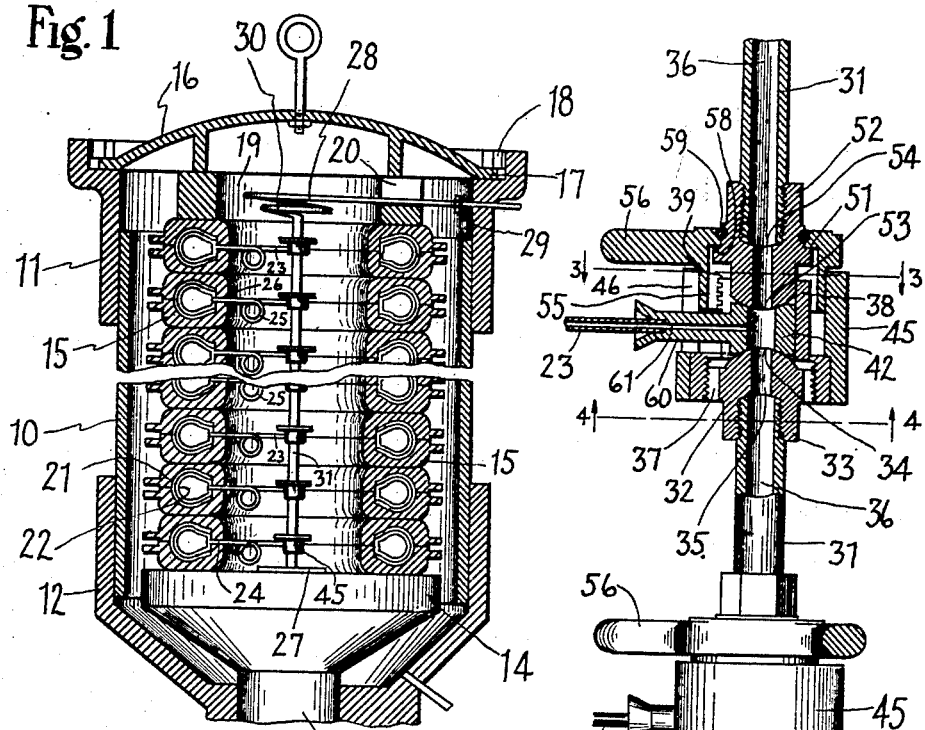
Fig. 1 is a vertical section of a vulcanizing heater, showing a stack of molds in position for vulcanization, the heater being shown as broken away for purposes of saving space.
Figure 3:
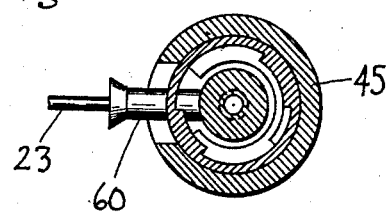
Fig. 3 is a section on line 3—3 of Fig. 2.
Figure 4:
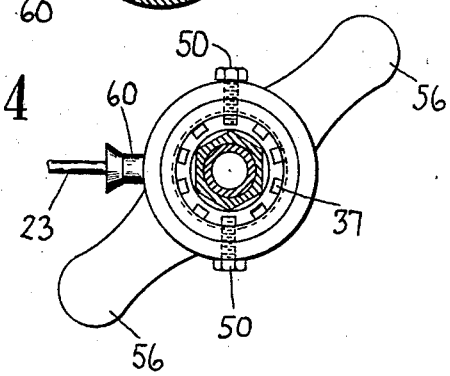
Fig. 4 is a section on line 4—4 of Fig. 2.

Referring to Fig. 1, 10 represents the shell of a vulcanizing heater of any usual or desired construction, and having top and bottom members 11 and 12 to which the shell is attached. Through the bottom member 12 passes a hydraulic ram 13 carrying a platform 14 upon which the stack of molds rests. By raising the ram the stack of molds may be pressed against the cover 16 of the heater, which is held in place by being rotated so that lugs 17 thereon will lie under lugs 18 on the top member 11. A spacing ring 19, having a slot 20 at one side, is preferably located between the top mold and the cover to afford space for certain piping to be described. By this means the individual molds, which are shown as of the usual type split circumferentially into two halves, are held closed. Inside the tire 21 in each mold is an annular expansible bag 22 which, when fluid pressure is introduced into it, will force the tire outwardly against the mold. Pressure is supplied to the bags by co-called "pigtails" or flexible tubes 23, extending between the stem 24 of the bag and a vertical pressure manifold to be described. Each pigtail may have a bend 25 in it so that it will be more flexible, and is attached to the stem of the bag by a wing nut 26.

The manifold is composed of a plurality of sections, one for each pigtail, and is designed so that it may be assembled rapidly as the tire-containing molds are stacked in the heater. The bottom section of the manifold conveniently rests on a base 27 on the platform 14, and the top section is connected by a pipe 28 (detachable at 29 to permit it to be removed from the heater) through which air or water under pressure may be admitted. Pipe 28 is preferably coiled as shown at 30 to render it more flexible, and passes through the slot 20 in ring 19 previously referred to.

Each section 31 of the manifold carries at its lower end the top part of a coupling adapted to connect it to the next lower section, and at its upper end the bottom part of a similar coupling adapted to connect it to the next higher section. In the case of the lowest manifold section, the coupling at its bottom end is of course omitted. Pipe 28 carries the top part of a coupling adapted to couple it to the uppermost manifold section. The pigtails are not directly connected to the manifold sections, but are adapted to be clamped thereto with a fluid tight joint when the couplings are connected together.

The bottom part of each coupling comprises a nipple 32 screwed to the pipe section 31, preferably having an integral nut 33 for convenience in attaching. The upper end of the nipple is shaped to form a conical or spherical seat 34, and the nipple has a hole 35 therethrough forming a continuation of the passage 36 in the pipe section. The outer surface of the nipple is screw threaded, and has a series of slots 37 for a purpose which will appear. Screwed onto the nipple is a member 38 having its upper portion formed on the outside with interrupted screw threads 39, the interruption being numbered 40. This member is cut away at 41 for the reception of a plug 42 attached to a pigtail 23. Plug 42 has at its top and bottom seats 43 bordering a hole 44 adapted to form a continuous passage with holes 35 and 36, the seats being adapted to conform to seat 34 on member 32 and a similar seat on the upper coupling member. Surrounding member 38 is a protecting cylinder 45, cut away at 46 in registration to the cut away portion 42, and serving as a protection for the screw threads 39 while spaced sufficiently therefrom to afford an annular recess 47 into which the clamping member of the upper part of the coupling may fit. This cylinder has opposed holes 48 registering with threaded holes 49 in the member 38, through which pass set screws 50, the ends of which fit in the slots 37 on nipple 32.

Figure 2:
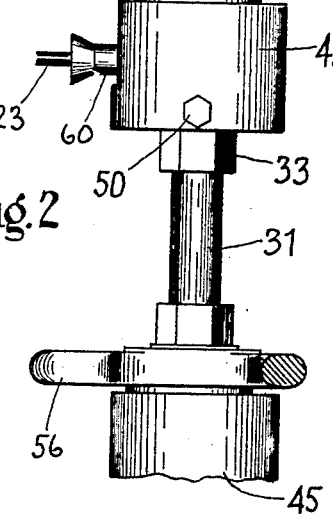
Fig. 2 is a detail, partly in median section, of three adjacent sections of the manifold used for supplying internal fluid pressure to the tires in the heater;

The top part of each coupling comprises a nipple 51, formed with an integral nut 52 assisting in securing it to the pipe section 31, and formed at its lower end with a seat 53 similar to seat 34. A hole 54 in this nipple registers with hole 44 in plug 42, hole 35 in nipple 32, and holes 36 in the pipe sections so as to form a continuous passage through which fluid under pressure may be passed. Surrounding nipple 51 is a clamping member 55 having handles 56. The body of this member forms a hollow cylinder adapted to fit into the annular recess 47, the inside surface of the cylinder being provided with interrupted screw threads 57 adapted to mesh with screw threads 39. The cylindrical part of the clamping member serves also as a protection for the seat 53. The clamping member is provided with a shoulder 58 seating against a corresponding shoulder on the nipple 51. A split spring ring 59, snapped into mating grooves in the nipple and clamping member (as best seen in Fig. 2) restrains the clamping member from movement on the nipple in a direction opposite to that prevented by shoulder 58. The clamping member is thus fixed longitudinally on the nipple, while relative rotation is permitted until actual clamping has taken place.

The clamping member is positioned within recess 47 on assembly so that its interrupted threads will pass along the spaces 40 between the interrupted threads 39 on member 38. When the parts have come to substantially the position of Fig. 2, handle 56 is rotated, causing the threads to mesh and the clamping member to press (by means of shoulder 58) the nipple 51 against the plug 42 interposed between it and nipple 32. By this means the parts are held firmly together in fluid tight relation. Preferably the interrupted screw threads are made similar in the two segments of the members 38 and 55, so that member 55 can be assembled with member 38 in either of two diametrically opposed positions. This is best accomplished by milling the threads, as this method avoids the sharpness of pitch incident to the use of a double pitch screw.

The pigtail 23 is connected as by brazing to a side extension 60 on the plug 42, the extension having a hole 61 connecting with hole 44 to give a fluid connection between the manifold and the pigtail. As a preferable manner of joining the pigtail to extension 60, I have shown the extension as provided with a flared end 62. This serves as a support for the pigtail when the latter is bent in adjusting it in place, and prevents breakage of the pigtail due to too sharp bending at this point.

The manner of operation of the device will now be described. The tires are assembled, together with their fluid bags, in the molds 15 at any suitable point, for example upon a conveyor leading to the vulcanizing heater. The pigtails, with plugs 42 connected, are preferably attached by wing nuts 26 to the stems of the air bag at this period. The lowermost mold is then placed upon the platform 14 of the heater, which for this purpose has been suitably elevated, the bottom manifold section 31 put in place, and the plug 42 laid in the opening 46 (Fig. 5). The next succeeding manifold section is put in place, and the threads 57 caused to engage with threads 39, but preferably not tightly drawn together. The second mold is placed on top of the lowest one, the upper manifold section already in place rotated so that the opening 46 will register with the plug 42 attached to the bag in the new mold, and the coupling below, which was previously left loose, tightened as by tapping the handle 56 with a bar. Succeeding molds are added in a similar manner.

It is useful to be able to rotate the couplings after they are in place to register openings 46 with the plugs 42, as this obviates the necessity of placing the molds in the heater with the pigtails in accurate alignment, a time-consuming process. The rotation of the bottom part of a coupling for this purpose is permitted through the top part of the next lower coupling. Referring to Fig. 2, the bottom part of the upper coupling is rigidly connected to the upper part of the next lower coupling. As pointed out previously, the nipple 51 (which is rigidly secured to the pipe section 31) is free to rotate between shoulder 58 and ring 59 until it is clamped between shoulder 58 and the plug 42 by rotation of the clamping member 55. By partially rotating each clamping member 55 as it is assembled with its lower coupling section, but leaving its final tightening until after the assembly of the next higher unit, a desirable flexibility in positioning the molds will result.

In case the seats of the two nipples and the plug wear sufficiently to prevent proper tightening of the joints when the clamping member is rotated to its limit of motion, set screws 50 may be backed off and member 38 screwed down upon nipple 32 until the desired degree of adjustment is secured. The set screws are then tightened, slots 37 acting to hold the parts firmly in location, in any desired condition of adjustment.

I realize that changes in detail may be made without departing from the spirit of the invention, and desire to claim the invention in both its specific and generic aspects.

Having thus described my invention, I claim:

1. A T-coupling comprising opposed nipples adapted to be secured to the main line pipe sections, a member secured to one of the nipples and having interrupted screw threads on its outer surface, a protecting cylinder secured around said member to protect the threads and the nipple but affording an annular space between it and the threads, said member and cylinder having registering open slots at one side, a clamping member revolubly secured to the second nipple and having a hollow cylindrical portion surrounding the nipple and adapted to fit within said annular space and having on its inner surface interrupted screw threads adapted to mesh with the threads on the first-named member, and a fluid-conducting plug adapted to fit between the two nipples and form a fluid tight joint therewith, all constructed and arranged so that the plug is clamped between the nipples and a fluid tight joint produced upon engagement and tightening of the clamping member with the mating screw threads.

2. A T-coupling comprising opposed nipples adapted to be secured to the main line pipe sections, said nipples having secured thereto interfitting interrupted screw threads whereby they may be coupled together by sliding the thread segments past each other, and locked by rotating one set of threads relative to the other, and a plug fitting between the nipples and presenting surfaces adapted to form fluid tight seats with the nipples when the coupling is locked, the nipples having passages connecting with the pipe sections, and the plug having a passage connecting with the passages in the nipples, and adapted to be connected to a branch pipe.

CHARLES H. DESAUTELS